Oct. 19, 1965  T. LODE  3,212,745
VIBRATION CONTROL MEANS
Filed March 21, 1962  2 Sheets-Sheet 1
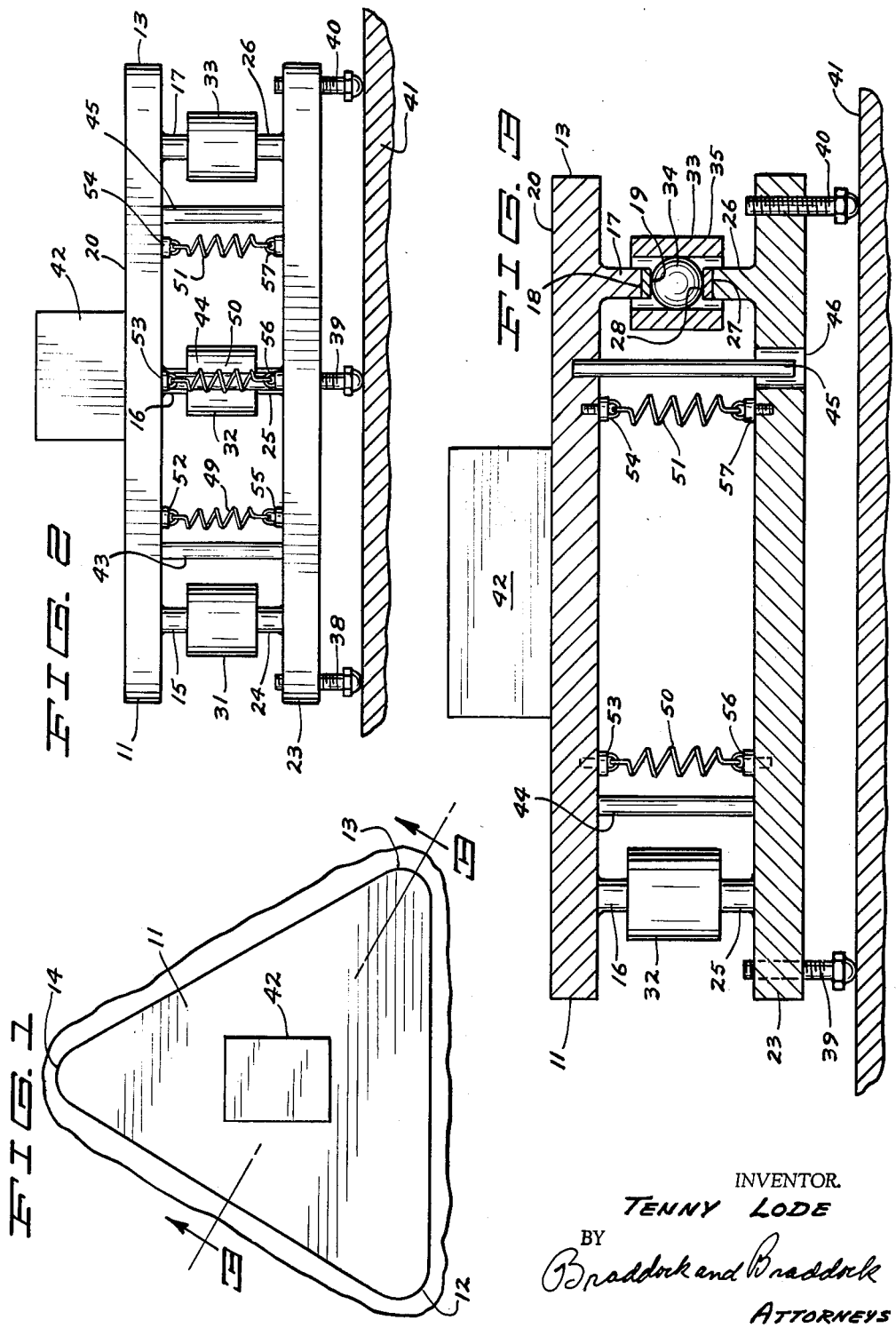
INVENTOR.
TENNY LODE
BY
Braddock and Braddock
ATTORNEYS

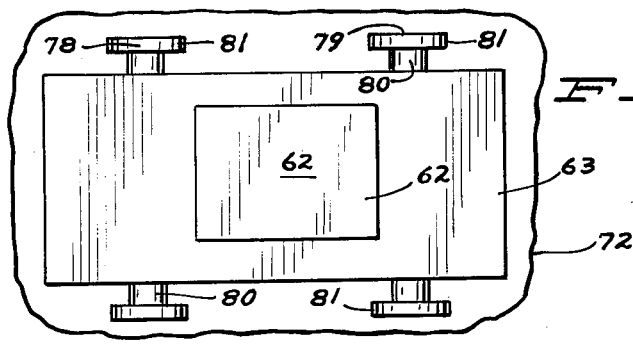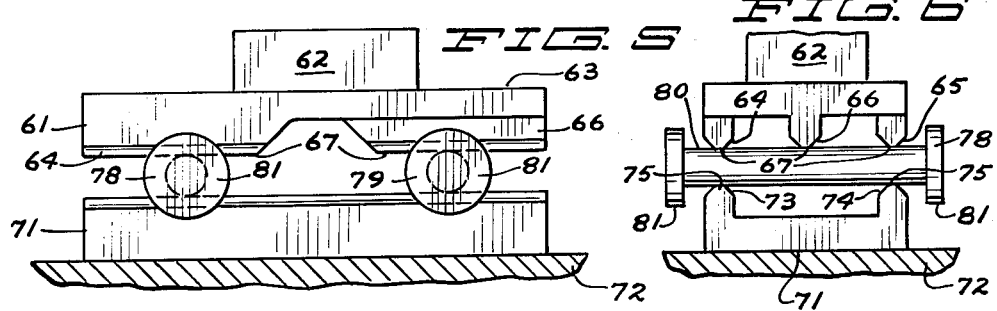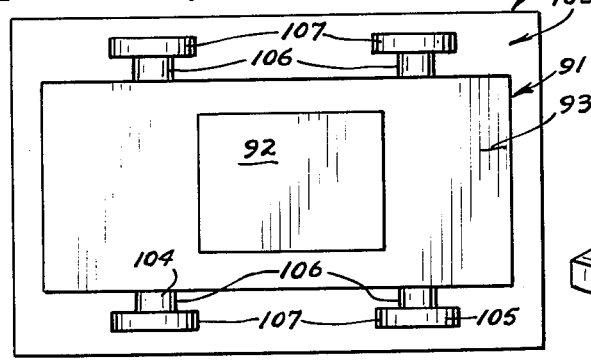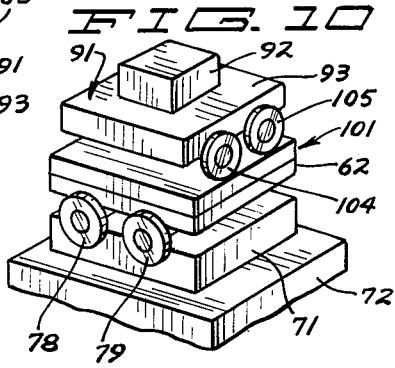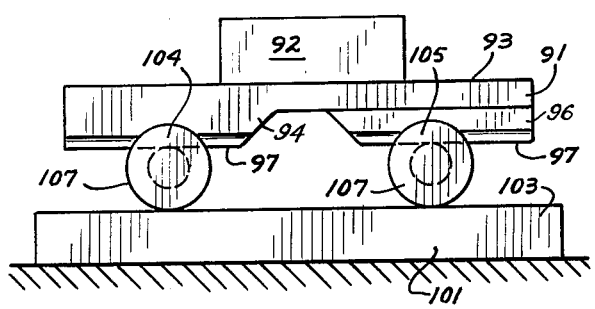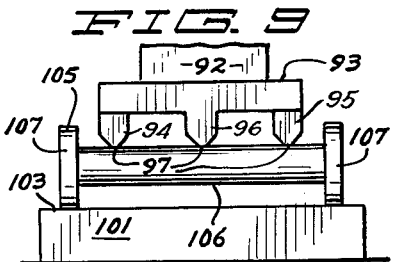

United States Patent Office 3,212,745
Patented Oct. 19, 1965

3,212,745
VIBRATION CONTROL MEANS
Tenny Lode, Minneapolis, Minn., assignor to Rosemount Engineering Company, Minneapolis, Minn., a corporation of Minnesota
Filed Mar. 21, 1962, Ser. No. 181,421
4 Claims. (Cl. 248—358)

This invention has relation to the isolation and control of mechanical motions, vibrations and forces. In particular applications it can relate among other things to the isolation of sensitive instruments from vibrations of supporting structures; the isolation of supporting structures from the vibrations of a supported machine; and the generation of a controlled motion or force along a selected axis.

The proper operation of sensitive scientific and other instruments and devices will often be disturbed by vibration and other motion of their supporting structures. For example, a sensitive galvanometer or analytical balance will give unsteady readings when vibrated or otherwise moved. An object of this invention is the isolation of such sensitive instruments and devices from vibration and other motion of surrounding structures to allow greater accuracy, reliability, and altogether more satisfactory operation of such instruments.

Many instruments and devices are more sensitive to disturbance by horizontal vibration or other motion than by vertical vibration or other motion. This difference in sensitivity frequently results from a mechanical design which is intended to withstand the force of gravity in a vertical direction while allowing relatively free motion in one or more horizontal directions. For example, a galvanometer used for precision electrical measurement can employ a movable coil held in place by taut vertical wires attached to the top and bottom of the movable coil. Such a structure is rigid in a vertical direction and vertical vibrations or other motions will have relatively little effect upon the accuracy and performance of the instrument. However, such an instrument is less rigid with respect to horizontal vibration or other motion. In general such instruments will be more adversely affected by horizontal motion including vibrations than by vertical motion including vibration. A further object of the present invention is, then, to isolate certain instruments and devices from horizontal vibrations or other motions which would otherwise particularly disturb the operation of such instruments and devices.

Many scientific and other instruments and devices must be leveled to assure satisfactory operation. For example, when some sensitive galvanometers and analytical balances are rotated about a non-vertical axis from their calibrated leveled position, significant errors will be introduced. It is a further object of this invention to provide vibration isolation or vibration control or both for a supported instrument or device while maintaining such instrument or device in a level or other desired position or attitude.

Many instruments and devices vibrate or otherwise move during operation. These motions will often be transmitted to their surroundings and can thus disturb the operation of other instruments or devices. For example, centrifuges or environmental testing equipment designed to deliberately vibrate equipment under test can often transmit vibrations to their surroundings and can thus affect the operation of other instruments or devices in the vicinity. A further object of this invention is to provide for the support of such vibrating or otherwise moving equipment in such a manner that the transmission of vibration or other motion to the suroundings is virtually eliminated or reduced to tolerable limits.

In certain applications it will be desirable to produce vibrations or other controlled motions along a single axis. For example, in the testing or calibration of an accelerometer or vibration sensor, it will sometimes be desirable to produce a vertical vibration or other motion without associated horizontal vibrations or other motions. A further object of the invention is to allow the selective elimination of a horizontal vibration or other motion and transmission of a vertical vibration or other motion to produce controlled single axis motion.

Other objects and advantages of the invention will be seen from the specification and claims which follow.

In a device made according to a first form of the invention, a base plate will be supported on three adjustable legs on a platform or table which is subject to objectionable horizontal vibration or other motion. Three short, flat-top circular cylindrical columns extend upwardly from this base plate and each of these columns serves as a support for one of three isolation rollers. Each such isolation roller includes a hardened, polished sphere held rigidly in the center of a short thick-walled hollow right circular cylinder. The diameter of the spheres and the inside diameter of the surounding cylinders as shown are larger than the outside diameter of the upright circular columns. The bottom of the spherical portion of each of the isolation rollers rests near the center of its supporting base plate column and the axis of the surrounding cylinder will be situated in substantially vertical alinement.

A top plate for supporting an instrument to be isolated from horizontal vibration or other motion is constructed as a mirror image of the base plate and has matching columns extending downwardly therefrom and resting on the tops of the spheres of the isolation rollers.

In a prefered embodiment of the invention, the size, shape and mass of the spherical and cylindrical sections of the isolation rollers will be such that the upper and lower contact points of the sphere with the base plate columns and top plate columns are complementary centers of percussion with respect to each other. In this manner, when the base plate is horizontally moved or vibrated because of the contact with the supporting structure, the bottom of the spherical surface of the isolation roller will be correspondingly moved or vibrated, but no force will be transmitted to the top plate supported at the center of percussion of the isolation roller with respect to the force exerted on the bottom of the sphere of the isolation roller. The top plate will, therefore, remain undisturbed.

In the event that the device producing vibration or other motion was placed on the top of the base plate in order to isolate the supporting structure from horizontal vibration or other motion, forces transmitted to the top of the spherical surface of the isolation rollers would not be transmitted to the columns on the base plates because of the fact that the bottoms of the spheres are located at the centers of percussion of the isolation rollers with respect to forces exerted at the top of the spheres.

In another form of the invention, a device is provided for isolating an object placed on the top of a top plate from transmitting or receiving horizontal vibration or other motion along a particular horizontal axis to or from a structure supporting a base plate. In this form of the invention, the isolation rollers can be cylindrical in form and can be supported on longitudinal columns extending upwardly from the base plate and will support parallel longitudinal columns extending downwardly from the top plate.

In the preferred embodiment of this form of the invention, the points at which the isolation rollers support the top plate will be at the center of percussion with respect to forces applied to the points where these rollers are supported on the base plate; and the points where these rollers are supported on the base plate will be at the center of percussion with respect to forces applied to the rollers at the point where they support the upper plate.

In the drawings,

FIG. 1 is a top plan view of a device made according to a first form of the invention showing its relationship to a supporting structure and to an object from which the supporting structure is to be isolated with respect to horizontal vibrations or other motions;

FIG. 2 is a side view of the device of FIG. 1;

FIG. 3 is an enlarged vertical sectional view taken on the line 3—3 in FIG. 1;

FIG. 4 is a top plan view of a device made according to a second form of the invention showing its relationship to a supporting structure and an object to be isolated from that structure with respect to vibrations along a single horizontal axis;

FIG. 5 is a side view of the device of FIG. 4;

FIG. 6 is an end view of the device of FIG. 4;

FIG. 7 is a top plan view of the device made according to a third form of the invention showing its relationship to an object to be isolated from a supporting structure with respect to vibration along a single horizontal axis and wherein a base plate of the invention is constituted as a part of such supporting structure;

FIG. 8 is a side view of the apparatus of FIG. 7;

FIG. 9 is an end view of the device of FIG. 7; and

FIG. 10 is a perspective view of a device of a fourth form of the invention.

Referring to FIGS. 1 through 3 of the drawings and the numerals of reference thereon, in a first form of the invention a top plate 11 is formed in a general shape of an equilateral triangle with rounded vertices 12, 13 and 14. A plurality of vertical columns 15, 16 and 17 extend downwardly from said top plate and each terminates in a bearing pad 18 which has a downwardly facing plane surface 19 which is precisely and exactly parallel to an upper surface 20 of the top plate. These three bottom surfaces 19, all lie in a single plane.

A base plate 23 is complementary in shape to the top plate 11 and includes vertical columns 24, 25 and 26 extending upwardly therefrom, each of said columns terminating in a bearing pad 27. Each of said bearing pads is provided with a plane surface 28. All three of these upper surfaces 28 lie in a single plane.

Isolation rollers 31, 32 and 33 are supported on base plate columns 24, 25 and 26 respectively and support top plate columns 15, 16 and 17 respectively. Each isolation roller consists of a sphere 34 fixedly and symmetrically positioned with respect to a hollow right circular cylinder 35. Each isolation roller is positioned with respect to its supporting and supported columns in such a way that the bottom of the sphere 34 is in the approximate center of the supporting column, the top of the sphere is in contact with the approximate center of the supported column and so that the axis of the right circular cylinder is substantially vertical.

Leveling screws 38, 39 and 40 are threadably mounted to the base plate 23 to extend downwardly from each of the vertices thereof and support the base plate with respect to supporting structure 41. These leveling screws are for supporting the entire apparatus so that the upper surface 20 of the top plate 11 and the plane coincident with the upper surfaces 28 of the bearing pads 27 will both be horizontal. This will insure that an object 42 to be isolated from horizontal vibration or other motion with respect to the supporting structure 41 will be supported in a horizontal plane by the upper surface 20 of the top plate 11.

In order to prevent large motion, limit stop rods 43, 44 and 45 are disclosed as being integral with and extending downwardly from the top plate 11 into three provided holes such as 46 through the base plate 23. Normally each of the limit stop rods 43, 44 and 45 will be situated in the approximate center of one of the holes 46, and the amount that said holes 46 exceed the diameter of the rods 43, 44 and 45 determines the amount of motion of the top plate with respect to the base plate which will be permitted by the limit rods.

To provide for reduction of long term motion or drift of the top plate with respect to the base plate, centering springs 49, 50 and 51 are provided between upper hooks 52, 53 and 54 extending downwardly from the top plate 11 and lower hooks 55, 56 and 57 extending upwardly from base plate 23.

*Operation*

The operation of the first form of the invention will be described in terms of the functions of the various elements thereof. Top plate 11 rests upon the uppermost portions of spheres 34 of isolation rollers 31, 32 and 33; the bottom portions of said spheres being supported by the base plate 23. Thus these isolation rollers may be regarded as a form of three point ball bearing support for the top plate 11, which support allows limited horizontal translational motion in two horizontal axes and limited rotational motion about any vertical axis. Because the vertical distances between bottom surfaces 19 of the bearing pads 18 of vertical columns 15, 16 and 17 and upper surfaces 28 of bearing pads 27 of the vertical columns 24, 25 and 26, respectively, are fixed, this three point ball bearing support of top plate 11 does not allow vertical motion of the top plate and of the object 42 supported thereon nor does it allow rotation of the top plate 11 and object 42 about a horizontal axis.

To further consider performance of the first form of the invention, the preferred properties of isolation rollers 31, 32 and 33 will now be considered in greater detail. Roller 33 is typical of each of the rollers and is shown in section to the right in FIG. 3.

It is convenient to initially assume the structure of FIG. 3 to be at rest and to neglect the constraint imposed by top plate 11 upon the motion of isolation roller 33. Now assume a motion of base plate 23, toward the right as seen in FIG. 3. This will apply an impulse Ft to the bottom of sphere 34 of roller 33, where F is the force and t is the time it is applied. This impulse will accelerate the center of mass of roller 33 to a linear velocity which may be expressed as:

$$\dot{X} = \frac{Ft}{m}$$

where $\dot{X}$ is the linear velocity of the center of mass of isolation roller 33 and m is the total mass of the isolation roller 33.

Let r represent the radius of the sphere 34 of the roller 33. Then, since the impulse applied at the upper surface 28 of the bearing pad 27 of the column 26 due to the motion of the base plate 23 to the right is applied at a distance r from the center of mass of the isolation roller 33, the impulse Ft also causes an angular acceleration of isolation roller 33 to a counter-clockwise angular velocity which may be expressed as:

$$\dot{\theta} = \frac{Ftr}{I}$$

where I is the angular moment of inertia of isolation roller 33 about the axis of rotation, namely the point where the top of the sphere 34 is in contact with the bottom surface 19 of the bearing pad 18 of the vertical column 17.

This angular velocity may also be expressed as:

$$\dot{\theta} = \frac{Ftr}{mk^2}$$

where k is the radius of gyration of isolation roller 33 about its center of mass.

With this combination of linear and angular motion of isolation roller 33, there will exist an instantaneous non-moving center of rotation at a distance a above the center of mass of the roller satisfying the relationship:

$$a = \frac{\ddot{X}}{\ddot{\theta}} = \frac{Ft/m}{Ftr/mk^2} = \frac{k^2}{r}$$

In a preferred embodiment of the invention, isolation roller 33 is constructed such that the radius of gyration (*k*) is equal to the radius *r* of the sphere 34. The equation above then becomes:

$$a = \frac{k^2}{r} = \frac{r^2}{r} = r$$

The top of sphere 34 is then the instantaneous center of rotation caused by a horizontal impulse applied to the bottom of the sphere. Thus, the top surface of sphere 34 remains stationary in spite of horizontal vibration or other motions of the bottom surface of the sphere 34 and motion or vibration of supporting structure 41 and base plate 23 will not transmit horizontal forces or vibration to top plate 11 and object 42.

Similarly, motions or vibrations of object 42 and top plate 11 will not transmit horizontal forces or vibrations to base plate 23 and structure 41.

In practice, small residual forces will be transmitted through springs 49, 50 and 51. However, these residual forces will be negligible in magnitude and may be neglected. These forces may be kept at a minimum by utilizing extremely weak springs.

An alternate view of the performance of isolation rollers 31, 32 and 33 is that any two opposite points on the top and bottom surfaces of the sphere 34 of these rollers will be complementary centers of percussion. Hence, the points of contact between isolation roller 33, for example, and bearing pads 18 and 27 will be complementary centers of percussion and a horizontal impulse or force applied to the isolation roller 33, for example, at any one such contact point will not be transmitted to the other.

An isolation roller which will meet the requirements of the above equations consists of a sphere of such as 34 constituted as a one inch diameter carbon steel ball obtained from a ball bearing manufacturer fixedly positioned in the exact center of the right circular cylinder such as 35 machined from aluminum bar stock and having an inside diameter of 0.997 inch, an outside diameter of 1.484 inches and a length of 1.550 inches. The density of the sphere 34 is 7.774 grams per cubic centimeter and the density of the aluminum bar stock is 2.781 grams per cubic centimeter.

Referring now to FIGS. 4, 5 and 6, in a second form of the invention, a top plate 61 supports an object 62 to be isolated from horizontal vibration or other motion on an upper plane surface 63 thereof. First and second vertical, longitudinally and downwardly extending parallel columns 64 and 65 are integral with top plate 61 at the left end thereof in FIG. 5, and vertical, longitudinally and downwardly extending column 66 is parallel to columns 64 and 65 and is integral with the top plate 61 at a right end thereof in FIG. 5. Each of the columns 64, 65 and 66 terminate in plane bottom surfaces 67. All of these bottom surfaces 67 lie in a single plane which is parallel to upper plane surface 63 of the top plate 61.

A base plate 71 rests on a supporting structure 72 and includes a pair of integral, parallel, spaced apart vertical, longitudinally and upwardly extending columns 73 and 74. Each of these columns terminates in plane upper surfaces 75. Both upper surfaces 75 normally lie in a single horizontal plane.

A pair of isolation rollers 78 and 79 are supported by columns 73 and 74. Isolation roller 78 supports columns 64 and 65, while isolation roller 79 supports column 66.

Each of these isolation rollers is constituted as a right circular cylindrical axle 80 and a pair of concentric wheels 81, 81 integral with said axle at opposite ends thereof.

As seen in the figures, the device is assembled so that the longitudinal axes of columns 64, 65 and 66 are parallel with the longitudinal axes of the columns 73 and 74, and so that the top plate 61 is directly over the base plate 71 and so that the columns 64 and 65 are directly over portions of the columns 73 and 74. The isolation rollers are positioned between the downwardly extending columns and the upwardly extending columns so that the cylindrical axes of the rollers and parallel to each other and are perpendicular to the longitudinal axes of the upwardly and downwardly extending columns.

As most clearly seen in FIG. 6 the plane bottom surfaces 67 of the downwardly extending columns will be supported on the top of the outer surface of the axles 80 while these axles will be supported on the upper surfaces 75 of the upwardly extending columns.

As shown, isolation rollers 78 and 79 are identical in construction. In each roller, the radius of gyration about the cylindrical axis is made equal to the radius of the axle 80. A motion or force applied to base plate 71 in a direction parallel to the longitudinal axes of the upwardly extending columns 73 and 74 will cause rollers 78 and 79 to move with a combination of rotational and translational motion such that no force is transmitted to top plates 61. The analogy to the operation of the first form of the device will be obvious.

Thus, top plate 61 and object 62 thereon are isolated from vibration and/or other forces applied to the base plate 71 and structure 72 in directions parallel to the longitudinal axes of columns 64, 65, 66, 73 and 74; or, more properly, at right angle to the cylindrical axes of the isolation rollers 78 and 79.

Supporting structure 72 and base plate 71 are similarly isolated from motions or forces applied to the top plate 61 by the object 62, for example, in direction perpendicular to the cylindrical axes of the parallel isolation rollers. Thus, the second form of the invention, as illustrated in FIGS. 4, 5 and 6 provides mechanical isolation between objects resting on the top plate 61 on the one hand and the base plate 71 and its supporting structure 72 on the other for translation forces and vibrations along a particular axis. This form of the invention as shown, however, does not provide isolation for horizontal forces or vibrations along an axis parallel to the axis of the isolation rollers, for vertical forces or vibrations, or for rotational forces or vibrations about any axis.

Referring now to FIGS. 7, 8 and 9, in a third form of the invention, a top plate 91 supports an object 92 to be isolated on an upper plane surface 93 thereof. Vertical, longitudinally and downwardly extending, spaced, parallel columns 94 and 95 are integral with top plate 91 at the left end thereof in FIG. 8; and a vertical, longitudinally and downwardly extending column 96 is mutually parallel to columns 94 and 95 and is integral with the top plate 91 at the right end thereof in FIG. 8. Each of these columns 94 and 95 and 96 terminates in plane bottom surfaces 97. All of said surfaces 97 lie in a single horizontal plane.

A base plate and supporting structure 101 has a plane horizontal upper surface 103.

A pair of isolation rollers 104 and 105 each consists of an axle 106 and a pair of concentric wheels 107, 107 integral with said axle at opposite ends thereof.

Isolation rollers 104 and 105 are supported on the plane horizontal surface 103 of supporting structure or base plate 101 at the bottom of the perpihery of the wheels 107, 107. The plane bottom surfaces 97 of the downwardly extending columns 94 and 95 of the top plate 91 are supported on the cylindrical top surface of the axle 106 of the isolation roller 104, and the bottom surface 97 of downwardly extending column 96 is supported on the top surface of the axle 106 of the isolation roller 105.

The third form of the invention illustrates a case in which the points of contact between the isolation roller and the top plate and between the isolation roller and the base plate are not the same distance from the center of symmetry of the isolation roller.

In the first form of the invention as disclosed in FIGS. 1, 2 and 3, the points of contact with the isolation roller and both the top plate and base plate were two opposite points on the surface of the same sphere. In the second form of the invention, as shown in FIGS. 4, 5 and 6, the points of contact between the isolation roller and the top plate and the isolation roller and the base plate were opposite points on the surface of the same cylindrical axle.

In the third form of the invention, as shown in FIGS. 7, 8 and 9, however, isolation is obtained between two points which are at different distances from the center of the isolation rollers.

In the third form of the invention, the radius ($k$) of gyration about the cylindrical axis is made equal to the square root of the product of the radius ($r_1$) of the axle 106 and the radius ($r_2$) of the wheels 107. Then, from the previous equation:

$$a = \frac{k^2}{r}$$

where $a$ is the distance from the center of mass of the roller at which an instantaneous non-moving center of rotation will exist, the isolation of a moving base plate supporting structure with respect to the top plate and object 92 can be analyzed; and the isolation of a moving or vibrating object 92 and top plate 91 with respect to the base plate can be analyzed.

In the case where forces or motion are applied to the base plate 101:

$$a = \frac{k}{r_1} = \frac{r_1 \times r_2}{r_2} = r_1$$

In the case where the object 92 imparts vibratory or other horizontal motion along an axis perpendicular to the cylindrical axis of the parallel isolation roller:

$$a = \frac{k}{r_1} = \frac{r_1 \times r_2}{r_1} = r_2$$

It is to be understood that refinements such as the centering springs and limit stops shown suggested in connection with the first form of the invention can incorporate into the second and third forms of the invention without departing from the spirit of the invention or the scope of the claims which follow.

In a fourth form of the invention, in order to provide a structure to isolate horizontal forces and vibrations in two perpendicular directions, the device of the FIGS. 7, 8 and 9 will be positioned on top of the top plate 62 of device of FIGS. 4, 5 and 6 in such a manner that the parallel cylindrical axes of isolation rollers 78 and 79 are in perpendicular relationship to the cylindrical axes of the parallel isolation rollers 104 and 105.

This structure can be obtained by placing the base plate 101 on the upper plane surface 63 of the top plate 61 with the cylindrical axes of the isolation rollers 78 and 79 in perpendicular relationship to the cylindrical axes of the isolation rollers 104 and 105. It can also be obtained by placing the isolation rollers 104 and 105 in parallel relationship to each other and in perpendicular relationship to isolation rollers 78 and 79 and with the wheels 107, 107 of each of the rollers 104 and 105 directly in contact with the upper plane surface 63 of the top plate 61, thus using plate 61 as the base plate as far as top plate 91 and rollers 104 and 105 are concerned and as the top plate as far as base plate 71 and rollers 78 and 79 are concerned.

I claim:

1. Vibration control means for isolating a supported object from a supporting structure with respect to horizontal vibration, said object being provided with an object plate having at least three mutually parallel plane horizontal surfaces at a bottom side thereof, said supporting structure being provided with a structure plate having at least three mutually parallel plane horizontal surfaces at an upper side thereof, each of said upper side structure plate surfaces being situated in vertically aligned underlying relationship to one of said bottom side object plate surfaces when said object plate is situated above said structure plate, said means including a plurality of isolation connection members each in contact with and supporting one of said bottom side object plate surfaces at a first point on said member and each in contact with and supported by one of said upper side structure plate surfaces at a second point on said member, each of said members being of such shape and form that said first point is at the center of percussion of said member with respect to horizontal forces exerted at said second point and said second point is at the center of percussion of said member with respect to horizontal forces exerted at said first point, and resilient means between said object plate and said structure plate to cause said plates to return to their initial position relative to each other after one of said plates has been subjected to a horizontal force.

2. Vibration control means for isolating a supported object from a supporting structure with respect to horizontal vibration, said object being provided with an object plate having at least three mutually parallel plane horizontal surfaces at a bottom side thereof, said supporting structure being provided with a structure plate having at least three mutually parallel plane horizontal surfaces at an upper side thereof, each of said upper side structure plate surfaces being situated in vertically aligned underlying relationship to one of said bottom side object plate surfaces when said object plate is situated above said structure plate, said means including a plurality of isolation connection members each in contact with a supporting one of said bottom side object plate surfaces at a first point on said member and each in contact with and supported by one of said upper side structure plate surfaces at a second point on said member, each of said members being of such shape and form that said first point is at the center of percussion of said member with respect to horizontal forces exerted at said second point and said second point is at the center of percussion of said member with respect to horizontal forces exerted at said first point, the plane surfaces of the object plate and the structure plate each being at the outer end of a separate column extending from and fixed to its respective plate.

3. The combination as specified in claim 1 and means to prevent relative movement between said plates beyond a predetermined maximum amount.

4. The combination as specified in claim 2 wherein said isolation connection members are comprised as spherical members between the aligning columns of the object plate and the structure plate, said spherical members being rigidly held inside a right circular cylinder of sufficient mass so that the points of contact between the spheres with the base plate and the object plate, respectively are complementary centers of percussion with respect to horizontal forces applied at the opposite point of contact, the cylinders being of greater diameter than the columns with which they are associated.

References Cited by the Examiner

UNITED STATES PATENTS

| | | | |
|---|---|---|---|
| 846,249 | 3/07 | Seiler | 50—104 |
| 1,158,932 | 11/15 | Kohl | 50—104 |
| 1,922,184 | 8/33 | White | 248—20 |
| 2,082,324 | 1/37 | Crafts | 248—20 X |
| 2,359,036 | 9/44 | Harper | 248—358 |
| 2,414,506 | 1/47 | Bowen | 248—20 |
| 2,469,661 | 5/49 | McElrath | 248—20 X |
| 2,513,834 | 7/50 | Zeidler | 248—19 X |
| 2,524,955 | 10/50 | Borzell | 248—19 X |
| 2,572,919 | 10/51 | French | 248—21 |
| 2,594,581 | 4/52 | Phelps | 248—19 X |

CLAUDE A. LE ROY, *Primary Examiner.*

FRANK L. ABBOTT, *Examiner.*